(12) United States Patent
Yuan et al.

(10) Patent No.: US 10,652,501 B2
(45) Date of Patent: May 12, 2020

(54) SCREEN CONTROL METHOD AND DEVICE

(71) Applicant: SZ DJI TECHNOLOGY CO., LTD, Shenzhen (CN)

(72) Inventors: Junhui Yuan, Shenzhen (CN); Deqiang Meng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/536,746

(22) Filed: Aug. 9, 2019

(65) Prior Publication Data

US 2019/0379857 A1 Dec. 12, 2019

Related U.S. Application Data

(63) Continuation of application No. PCT/CN2018/090481, filed on Jun. 8, 2018.

(51) Int. Cl.
| | |
|---|---|
| *G06T 3/60* | (2006.01) |
| *H04N 5/445* | (2011.01) |
| *H04N 5/235* | (2006.01) |
| *H04N 5/232* | (2006.01) |
| *G03B 19/02* | (2006.01) |

(52) U.S. Cl.
CPC ............ *H04N 5/44591* (2013.01); *G06T 3/60* (2013.01); *H04N 5/2353* (2013.01); *H04N 5/23219* (2013.01); *H04N 5/232933* (2018.08); *G03B 19/02* (2013.01)

(58) Field of Classification Search
CPC ...... G03B 19/02; G06T 3/60; H04N 5/23219; H04N 5/232933; H04N 5/2353; H04N 5/44591

USPC ......................................................... 345/158
See application file for complete search history.

(56) References Cited

U.S. PATENT DOCUMENTS

| | | | | |
|---|---|---|---|---|
| 6,806,906 | B1* | 10/2004 | Soga ...................... | H04N 5/232 348/333.03 |
| 8,223,242 | B2* | 7/2012 | Ueda ..................... | G02B 7/102 348/333.01 |
| 2004/0008266 | A1* | 1/2004 | Kitada ............... | H04N 1/00307 348/211.13 |

(Continued)

FOREIGN PATENT DOCUMENTS

| | | |
|---|---|---|
| CN | 203070267 U | 7/2013 |
| CN | 104580891 A | 4/2015 |

(Continued)

OTHER PUBLICATIONS

International Search Report from the State Intellectual Property Office of the P.R. China for International Application No. PCT/CN2018/090481, dated Mar. 6, 2019 (5 pages).

*Primary Examiner* — Tony O Davis
(74) *Attorney, Agent, or Firm* — Finnegan, Henderson, Farabow, Garrett & Dunner, LLP

(57) ABSTRACT

A screen control method is provided. The method is implemented in a terminal device having a first screen, a second screen, and a lens, the first screen and the second screen being disposed facing against one another. The method includes obtaining a command configured to instruct to display the image captured by the lens on the second screen. The method also includes controlling display of the image captured by the lens on the second screen based on the command.

18 Claims, 14 Drawing Sheets

(56) References Cited

U.S. PATENT DOCUMENTS

| | | | |
|---|---|---|---|
| 2004/0048633 A1* | 3/2004 | Sato | H04M 1/0214 455/556.1 |
| 2004/0141162 A1* | 7/2004 | Olbrich | G06F 3/017 353/119 |
| 2005/0164745 A1* | 7/2005 | Oe | H04M 1/021 455/566 |
| 2008/0231740 A1* | 9/2008 | McIntyre | H04N 5/2251 348/333.01 |
| 2009/0273573 A1* | 11/2009 | Hotelling | G06F 3/0362 345/173 |
| 2009/0303352 A1* | 12/2009 | Fujinawa | H04N 1/00442 348/231.99 |
| 2009/0319879 A1* | 12/2009 | Scott | G06F 3/0481 715/205 |
| 2012/0229380 A1* | 9/2012 | Silvester | G06F 1/1626 345/158 |
| 2013/0035941 A1* | 2/2013 | Kim | G06F 3/017 704/275 |
| 2014/0078102 A1* | 3/2014 | Araki | G06F 3/016 345/174 |
| 2014/0352221 A1* | 12/2014 | Mitsui | H04M 1/0216 49/208 |
| 2017/0374274 A1* | 12/2017 | Martin Perez | H04N 5/2253 |
| 2019/0212163 A1* | 7/2019 | Li | G01O 21/20 |

FOREIGN PATENT DOCUMENTS

| | | |
|---|---|---|
| CN | 105120180 A | 12/2015 |
| CN | 105141852 A | 12/2015 |

\* cited by examiner

SCREEN CONTROL METHOD AND DEVICE

CROSS-REFERENCE TO RELATED APPLICATION

This application is a continuation application of International Application No. PCT/CN2018/090481, filed on Jun. 8, 2018, the entire contents of which are incorporated herein by reference.

TECHNICAL FIELD

The present disclosure relates to smart terminal technology and, more particular, to a screen control method and device.

BACKGROUND

Currently, for a user to conveniently obtain imaging parameters for selfie shooting when the user performs a selfie shooting, a camera may provide two screens; in a selfie shooting, a first screen displays an image captured by a lens, and a second screen displays imaging parameters.

However, because the camera only has one lens, and due to the limitation on the imaging direction of the lens, the image captured by the lens is displayed on the first screen. In a selfie shooting, the first screen faces against the user, and the user cannot know what images the lens has captured, which makes it difficult to capture the user desired images.

SUMMARY

Embodiments of the present disclosure provide a screen control method and device, such that when the user performs a selfie shooting, the user can know the images captured by the lens, thereby capturing the user desired images.

In accordance with an aspect of the present disclosure, a screen control method is provided. The method is implemented in a terminal device having a first screen, a second screen, and a lens, the first screen and the second screen being disposed facing against one another. The method includes obtaining a command configured to instruct to display the image captured by the lens on the second screen. The method also includes controlling display of the image captured by the lens on the second screen based on the command.

In summary, the screen control device of the present disclosure controls the display of the image captured by the lens on the second screen based on the command configured to instruct to display the image captured by the lens on the second screen. The second screen is a screen the user faces when performing a selfie shooting. As such, when the user performs a selfie shooting, the user can view the image captured by the lens, thereby capturing the user desired images. User experience is enhanced.

BRIEF DESCRIPTION OF THE DRAWINGS

To describe the technical solutions of the embodiments of the present disclosure in detail, next, the drawings referred to in the descriptions of the embodiments of the present disclosure will be briefly introduced. Evidently, the drawings described below are only some embodiments of the present disclosure. A person having ordinary skills in the art can obtain other drawings based on these drawings without creative effort.

DETAILED DESCRIPTION OF THE EMBODIMENTS

Figure 1:
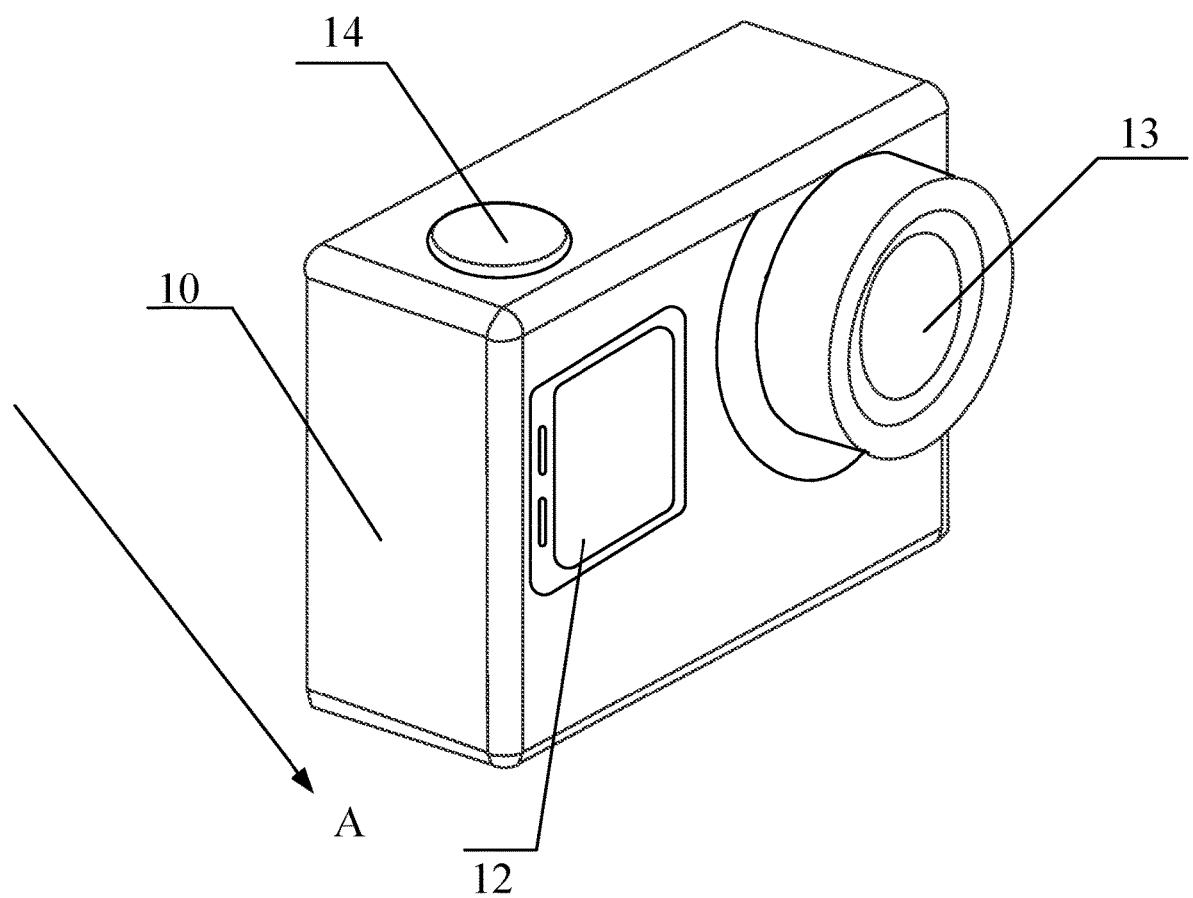
FIG. 1 is a perspective view of a schematic structure of a camera, in accordance with an embodiment of the present disclosure.

To render the purpose, technical solutions, and advantages of the embodiments of the present disclosure clearer, next, with reference to the accompanying drawings of the embodiments of the present disclosure, the technical solutions of the embodiments of the present disclosure will be described in details. The described embodiments are only some embodiments of the present disclosure, but not all of the embodiments. Based on the embodiments of the present disclosure, a person having ordinary skills in the art can obtain other embodiments without creative effort, which also belong to the scope of protection of the present disclosure.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "vertical," "left," "right," "up," "upward," "upwardly," "down," "downward," "downwardly," and similar expressions used herein are merely intended for describing relative positional relationship.

It should be understood that in the present disclosure, relational terms such as first and second, etc., are only used to distinguish an entity or operation from another entity or operation, and do not necessarily require or imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

A person having ordinary skills in the art can appreciate that when the term "and/or" is used, the term describes a relationship between related items. The term "and/or" means three relationships may exist between the related items. For example, A and/or B can mean A only, A and B, and B only. The symbol "/" means "or" between the related items separated by the symbol. The phrase "at least one of" A, B, or C encompasses all combinations of A, B, and C, such as A only, B only, C only, A and B, B and C, A and C, and A, B, and C. The term "and/or" may be interpreted as "at least one of" The term "communicatively coupled" or "communicatively connected" indicates that related items are coupled or connected through a communication channel, such as a wired or wireless communication channel.

The embodiments of the present disclosure provide a screen control method and device. The screen control device may be a camera. When the user uses the camera for a non-selfie shooting, the user may face a first screen. The user may view the images captured by the lens, and therefore can capture the user desired images. When the user performs a selfie shooting, the user may face a second screen. The first screen displays the images captured by the lens, which are not viewable to the user.

Figure 2:
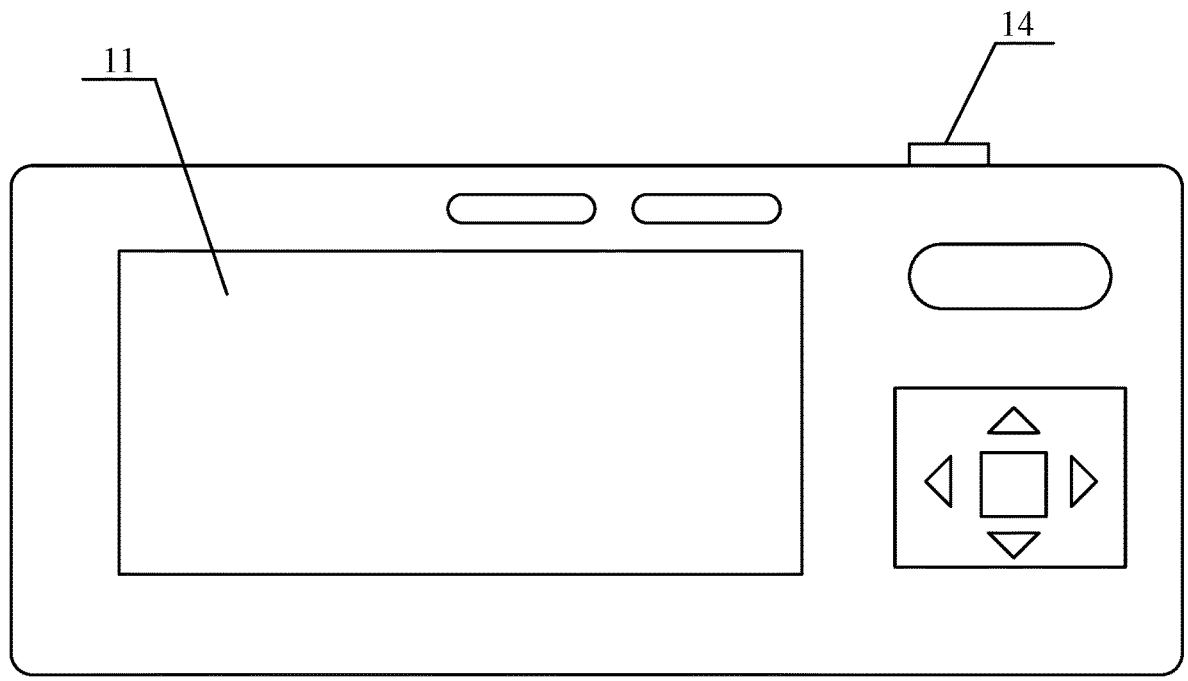
FIG. 2 is a front view of the camera along the A direction in FIG. 1, in accordance with an embodiment of the present disclosure.

To solve the above problems, the embodiments of the present disclosure provide a camera. FIG. 1 is a perspective view of a schematic structure of the camera provided by the present disclosure. FIG. 2 is a front view of the camera in the A direction of FIG. 1. Referring to FIG. 1 and FIG. 2, the camera may include a machine body 10, and a first screen 11, a second screen 12, a lens 13, and a shutter 14 disposed on the machine body 10. The first screen 11 and the second screen 12 may be disposed facing against one another. The lens 13 may be disposed at a second screen 12 side. The first screen 11 may be a screen that displays the images captured by the lens 13 after the camera starts up. The camera of the present embodiment may also include a controller. The controller may be configured to obtain a first command.

It can be understood that, because the first screen 11 and the second screen 12 are disposed facing against one another, only the second screen 12 can be viewed in FIG. 1. The first screen 11 can be viewed in FIG. 2.

Figure 3:
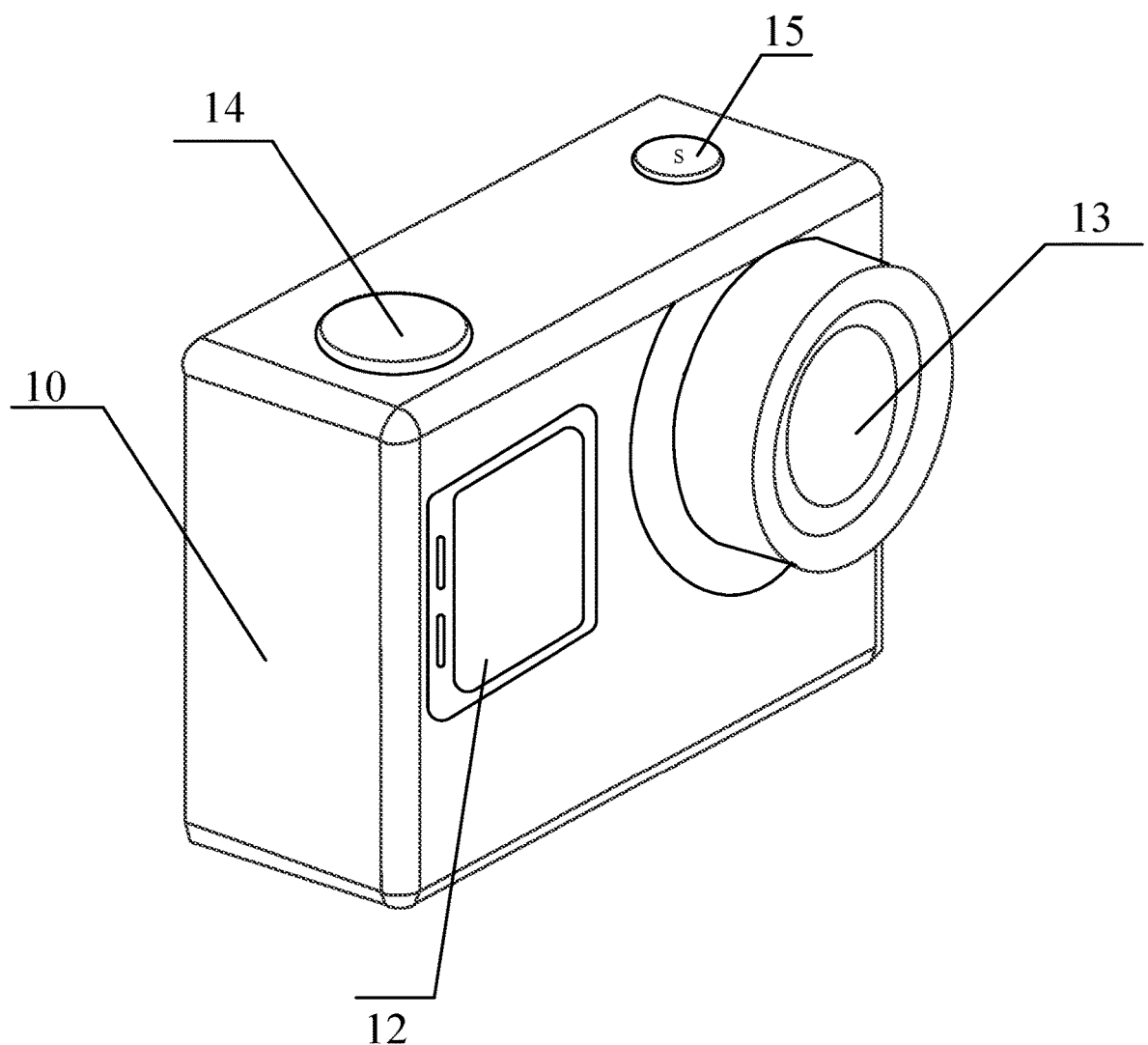
FIG. 3 is another perspective view of the schematic structure of the camera, in accordance with an embodiment of the present disclosure.

FIG. 3 is a second perspective view of the schematic structure of the camera provided by the present disclosure. Referring to FIG. 3, based on the camera provided in FIG. 1 and FIG. 2, the camera shown in FIG. 3 may also include a screen switching key 15. When the user operates the screen switching key 15, the controller may obtain the first command, and may control, based on the first command, switching from the first screen 11 to the second screen 12 to display images captured by the lens 13 or switching from the second screen 12 to the first screen 11 to display the images captured by the lens 13.

Next, with reference to specific embodiments, the screen control method of the camera shown in FIG. 1, FIG. 2, or FIG. 3 provided by the embodiments of the present disclosure will be described.

Figure 4:
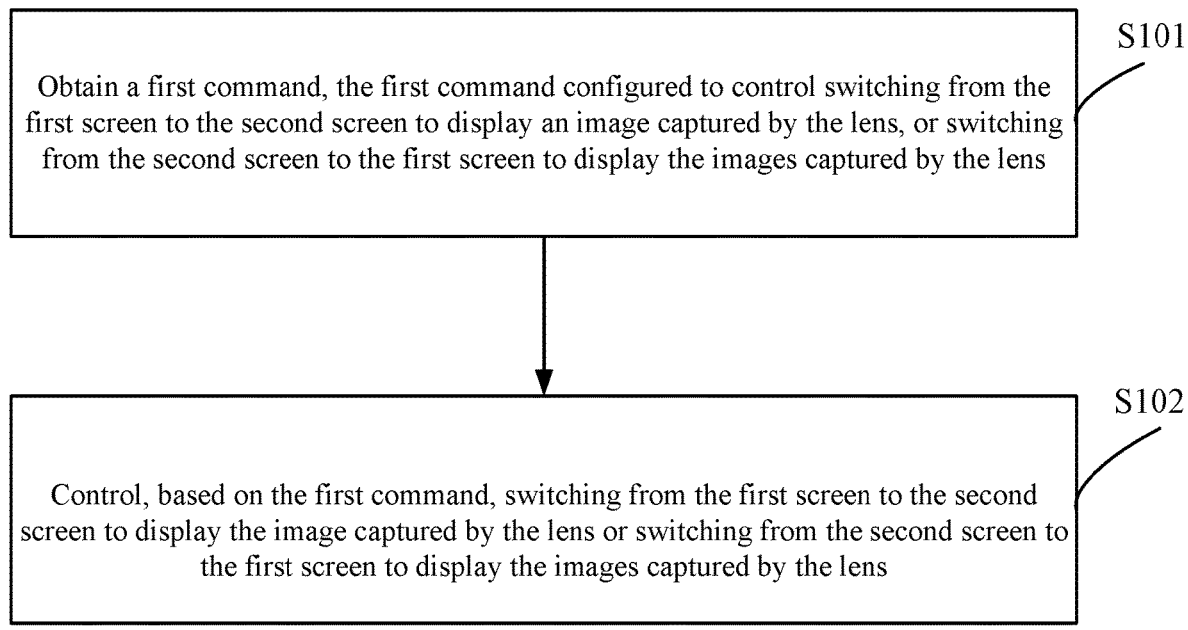
FIG. 4 is a first flow chart illustrating a screen control method, in accordance with an embodiment of the present disclosure.

FIG. 4 is a first flow chart illustrating a screen control method provided by the embodiments of the present disclosure. As shown in FIG. 4, the method of the present embodiment may include:

Step S101: obtaining a first command, the first command configured to control switching from the first screen 11 to the second screen 12 to display an image captured by the lens 13, or switching from the second screen 12 to the first screen 11 to display the images captured by the lens 13;

Step S102: controlling, based on the first command, switching from the first screen 11 to the second screen 12 to display the image captured by the lens 13 or switching from the second screen 12 to the first screen 11 to display the images captured by the lens 13;

In some embodiments, the execution entity of the present embodiment may be the camera shown in FIG. 1, FIG. 2, or FIG. 3;

In some embodiments, if the first screen 11 displays an image captured by the lens 13, when the user desires to perform a selfie shooting, the user may perform a predetermined operation on the camera. The controller of the camera may obtain, based on the predetermined operation of the user, the first command configured to instruct to switch the screen for displaying the image captured by the lens 13.

Next, the camera may control, based on the first command, the switching from the first screen 11 to the second screen 12 to display the image captured by the lens 13. As such, the user who performs the selfie shooting can view the images captured by the lens 13 through the second screen 12, thereby capturing the user desired images.

Because in a selfie shooting, there is a need to place the lens 13 of the camera to face oneself. Thus, the second screen 12 may face the user. After the controller controls the display of the image captured by the lens 13 at the second screen 12, the user may view the image captured by the lens when performing a selfie shooting.

When the user finishes the selfie shooting, and captures images in a non-selfie shooting scene, the user may place the lens 13 of the camera to face an imaging object. Then, the first screen 11 may face the user. The user may again perform a predetermined operation on the camera. The controller of the camera may obtain, based on the predetermined operations by the user, the first command configured to instruct to switch the screen for displaying the image captured by the lens 13.

Next, the camera may control, based on the first command, the switching from the second screen 12 to the first screen 11 to display the image captured by the lens 13. As such, a user performing a non-selfie shooting may view the image captured by the lens 13 through the first screen 11, thereby capturing the user desired images.

In a non-selfie shooting, the user may place the lens 13 to face the imaging object. Then, the first screen 11 may face the user. After the controller controls the display of the image captured by the lens 13 on the first screen 11, the user can view the image captured by the lens when performing a non-selfie shooting.

In some embodiments, the first screen 11 and the second screen 12 may be touch screens. The predetermined operation may be touching a predetermined path on the second screen 12 or the first screen 11 of the camera, uttering a predetermined voice, moving the camera based on a predetermined action, clicking a predetermined location on the second screen 12 or the first screen 11, clicking a screen switching key 15 disposed on the machine body 10, etc.

Further, to save the energy consumption of the camera, after controlling the switch from the first screen 11 to the second screen 12 to display the image captured by the lens 13, the controller may control the first screen 11 to be in a screen blackout state; or After controlling the switch from the second screen 12 to the first screen 11 to display the image captured by the lens 13, the controller may control the second screen 12 to be in the screen blackout state.

In the present embodiment, the camera may control, based on the first command that instructs to switch the display of the image captured by the lens, the switch from the first screen to the second screen to display the image captured by the lens or the switch from the second screen to the first screen to display the image captured by the lens. The second screen may be a screen the user faces when performing a selfie shooting. As such, when the user performs a selfie shooting and a non-selfie shooting, the user can view the image captured by the lens, thereby capturing the user desired images. User experience is enhanced.

In addition, besides the screen control method of the embodiment shown in FIG. 1, the screen control method may also include the following implementation methods: if the first screen 11 displays an image captured by the lens 13, and the second screen 12 does not display the image captured by the lens 13, when the user performs a selfie shooting, the user may perform a predetermined operation on the camera. After the controller obtains the first command based on the predetermined operation, the controller may control, based on the first command, the second screen 12 to display the image captured by the lens 13. However, the first screen 11 may continue to display the image captured by the lens 13. In other words, two screens may simultaneously display the images captured by the lens 13. In this implementation method, when the selfie shooting is switched to a non-selfie shooting, there is no need to again perform the predetermined operation. When the selfie shooting is to be performed again, there is also no need to perform the predetermined operation.

Next, with reference to the embodiments shown in FIG. 5 to FIG. 11, the screen control method under the scene of the user performing a selfie shooting, as shown in the embodiment in FIG. 1, will be described in detail.

Figure 5:
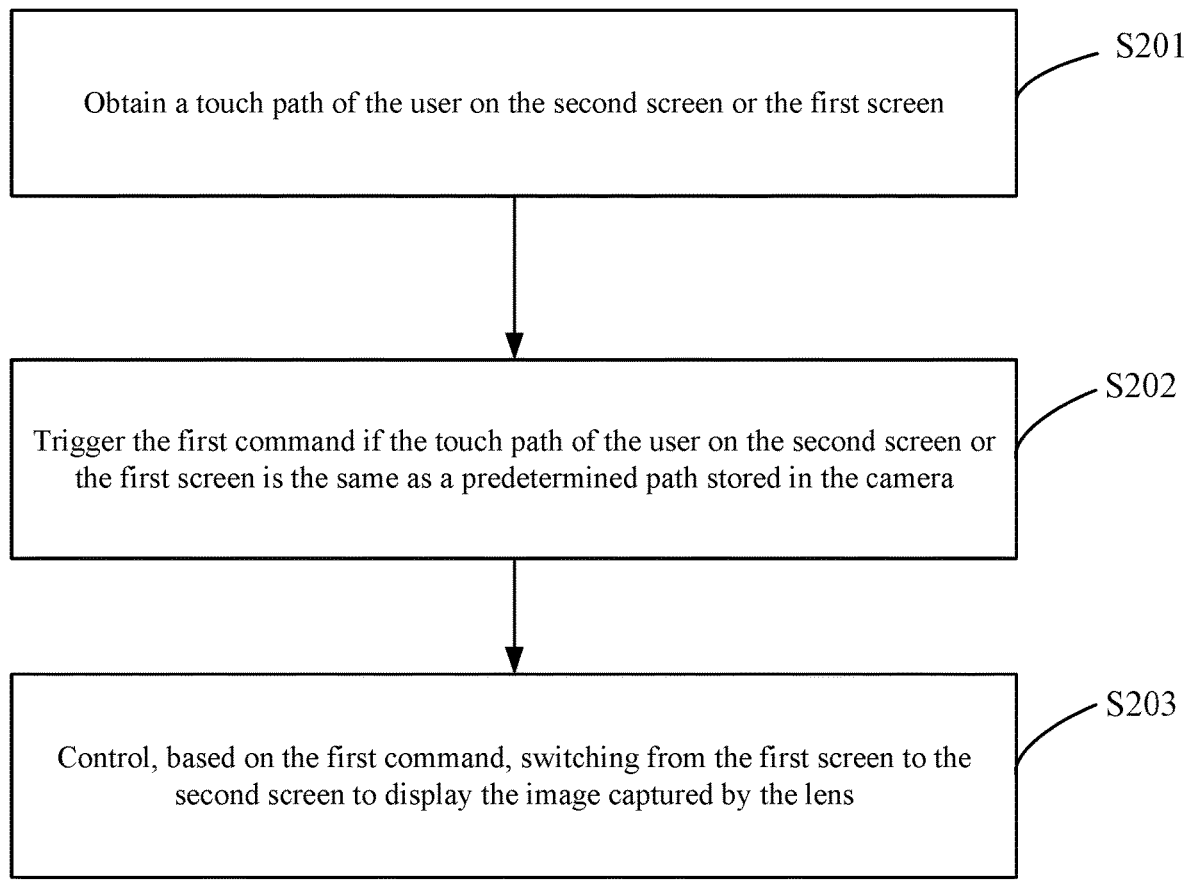
FIG. 5 is a second flow chart illustrating a screen control method, in accordance with an embodiment of the present disclosure.

FIG. 5 is a second flow chart illustrating a screen control method provided by the embodiments of the present disclosure. As shown in FIG. 5, the method of the present disclosure may include:

Step S201: obtaining a touch path of the user on the second screen 12 or the first screen 11;

Step S202: triggering the first command if the touch path of the user on the second screen 12 or the first screen 11 is the same as a predetermined path stored in the camera;

Step S203: controlling, based on the first command, switching from the first screen 11 to the second screen 12 to display the image captured by the lens 13.

In some embodiments, the second screen 12 and/or the first screen 11 of the present embodiment are touch screens.

In some embodiments, if the first screen 11 displays an image captured by the lens 13, when the user desires to perform a selfie shooting, a finger of the user may perform a touch operation on the first screen 11 or the second screen 12. The controller may obtain the touch path corresponding to the touch operation of the user, and determine whether the touch path of the user on the first screen 11 or the second screen 12 is the same as the predetermined path stored in the camera. If they are the same, the controller may trigger the first command;

Next, after the first command is triggered, the camera may control switching from the first screen 11 to the second screen 12 to display the image captured by the lens 13.

Because in a selfie shooting, there is a need to place the lens 13 of the camera to face oneself, the second screen 12 may face the user. After the controller controls the display of the image captured by the lens 13 on the second screen 12, the user can view the image captured by the lens 13 in a selfie shooting.

It can be understood that, if the second screen 12 and the first screen 11 are both touch screens, when switching from a non-selfie shooting scene to a selfie shooting scene, the user may place the lens 13 of the camera to face the user after the second screen 12 displays the image captured by the lens 13. Then, the user may perform a touch operation on the first screen 11. If the non-selfie shooting scene is switched to a selfie shooting scene, the user may place the lens 13 of the camera to face the user. Then, the second screen 12 may face the user. The user may perform a touch operation on the second screen 12.

The method of the present disclosure enables the user to view the image captured by the lens in a selfie shooting, thereby enabling the user to capture the user desired images. User experience is enhanced.

Corresponding to the embodiment shown in FIG. 5, if the selfie shooting is switched to the non-selfie shooting, the screen control method may include: obtaining a touch path of the user on the first screen 11 or the second screen 12; if the touch path of the user on the first screen 11 or the second screen 12 is the same as the predetermined path stored in the camera, triggering the first command; and controlling, based on the first command, switching from the second screen 12 to the first screen 11 to display the image captured by the lens 13. The detailed processes are not repeated.

Figure 6:
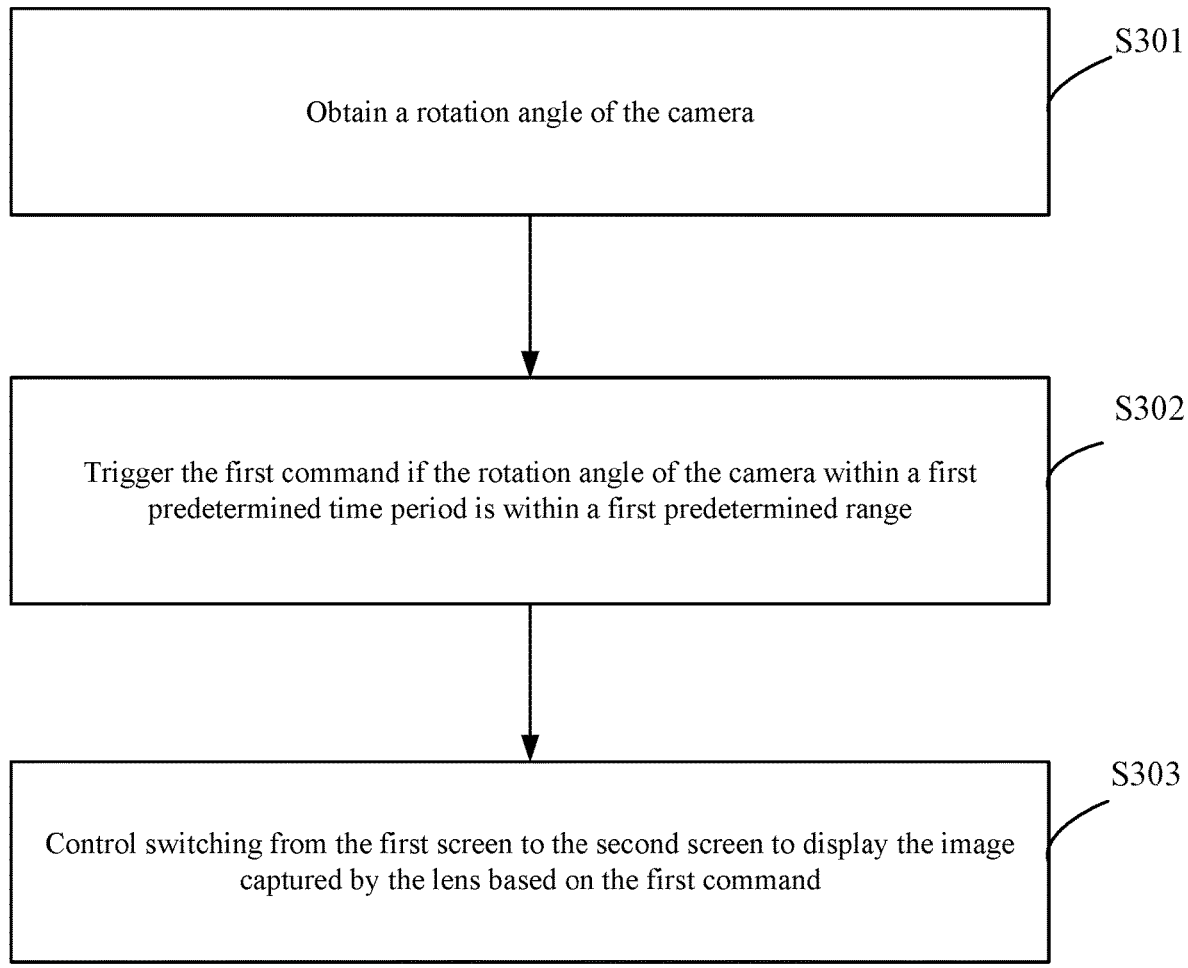
FIG. 6 is a third flow chart illustrating a screen control method, in accordance with an embodiment of the present disclosure.

FIG. 6 is a third flow chart illustrating a screen control method provided by the embodiments of the present disclosure. As shown in FIG. 6, the method of the present embodiment may include:

Step S301: obtaining a rotation angle of the camera;

Step S302: triggering the first command if the rotation angle of the camera within a first predetermined time period is within a first predetermined range;

Step S303: controlling, based on the first command, switching from the first screen 11 to the second screen 12 to display the image captured by the lens 13.

In some embodiments, the camera of the present embodiment may include an angle sensor. The angle sensor may include at least one of an electronic compass or a gyroscope.

In some embodiments, if the first screen 11 displays an image captured by the lens 13, when the user desires to perform a selfie shooting, the user may rotate the camera to any angle within the first predetermined range within the first predetermined time period. The angle sensor in the camera may detect the rotation angle or the rotation angular velocity of the camera. If the angle sensor is the gyroscope, the gyroscope may detect the rotation angular velocity of the camera. The controller in the camera may obtain the rotation angle of the camera based on the rotation angular velocity detected by the gyroscope. If the angle sensor is the electronic compass, the electronic compass may detect the rotation angle of the camera. The controller in the camera may obtain the rotation angle of the camera detected by the electronic compass.

If the rotation angle obtained by the controller in the camera within the first predetermined time period is within the first predetermined range, then the controller may trigger the first command.

It can be understood that, during the rotation of the camera, the second screen 12 can be maintained to face the user.

In some embodiments, the first predetermined time period may be any time period between 0.2 to 2 seconds.

In some embodiments, the first predetermined time period may be any time period between 0.5 to 1 seconds.

In some embodiments, the first predetermined range may be 160° to 200°, or −200° to −160°.

In some embodiments, the first predetermined range may be 170° to 180°; or −190° to −170°.

In some embodiments, the positive angle range means the camera rotates clockwise, the negative angle range means the camera rotates counter-clockwise.

For example: the camera may detect that the camera rotates 180° within 1 second, and then trigger the first command. As another example: the camera may detect that the camera rotates −175° within 0.8 seconds, and then trigger the first command.

Next, after the first command is triggered, the camera may control switching from the first screen 11 to the second screen 12 to display the image captured by the lens 13.

Because in a selfie shooting, there is a need to place the lens 13 of the camera to face oneself, the second screen 12 may face the user. After the controller controls the display of the image captured by the lens 13 on the second screen 12, the user may view the image captured by the lens 13 in a selfie shooting.

The method of the present embodiment enables the user to view the image captured by the lens, thereby enabling the user to capture the user desired images. User experience is enhanced.

Corresponding to the embodiment shown in FIG. 6, if the user switches from a selfie shooting to a non-selfie shooting, the screen control method may include: obtaining a rotation angle of the camera; if the rotation angle of the camera within a first predetermined time period is within a first predetermined range, triggering a first command; and controlling, based on the first command, switching from the second screen 12 to the first screen 11 to display an image captured by the lens 13. The detailed processes are not repeated.

Figure 7:
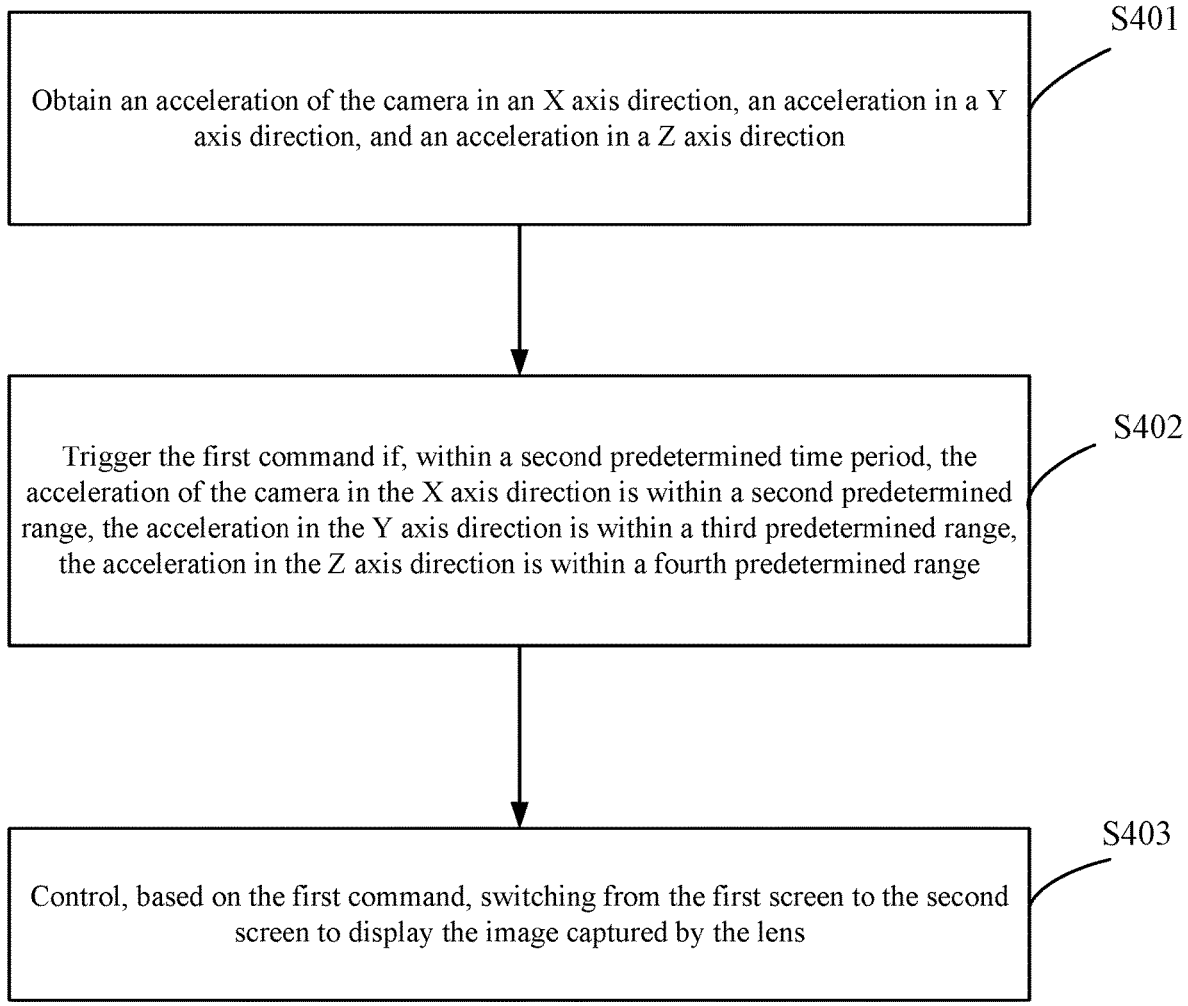
FIG. 7 is a fourth flow chart illustrating a screen control method, in accordance with an embodiment of the present disclosure.

FIG. 7 is a fourth flow chart illustrating a screen control method provided by the embodiments of the present disclosure. As shown in FIG. 7, the method of the present embodiment may include:

Step S401: obtaining an acceleration of the camera in an X axis direction, an acceleration in a Y axis direction, and an acceleration in a Z axis direction;

Step S402: triggering the first command if, within a second predetermined time period, the acceleration of the camera in the X axis direction is within a second predetermined range, the acceleration in the Y axis direction is within a third predetermined range, and the acceleration in the Z axis direction is within a fourth predetermined range;

Step S403: controlling, based on the first command, switching from the first screen 11 to the second screen 12 to display the image captured by the lens 13.

In some embodiments, the camera of the present embodiment may include an accelerometer or other structure that can measure the acceleration of the camera.

In some embodiments, if the first screen 11 displays an image captured by the lens 13, when the user desires to perform a selfie shooting, the user may move the camera back and forth within the second predetermined time period, i.e., make the camera to perform a round-trip movement. The accelerometer in the camera may detect, during the movement of the camera, the acceleration in the X axis direction, the acceleration in the Y axis direction, and the acceleration in the Z axis direction. After the controller inside the camera obtains, during the movement of the camera, the acceleration in the X axis direction, the acceleration in the Y axis direction, and the acceleration in the Z axis direction, if the controller determines that within the second predetermined time period the acceleration of the camera in the X axis direction is within the second predetermined range, the acceleration in the Y axis direction is within the third predetermined range, and the acceleration in the Z axis direction is within the fourth predetermined range, the controller may trigger the first command. In some embodiments, the second predetermined range, the third predetermined range, and the fourth predetermined range may be ranges corresponding to a moving state of the camera being in a round-trip movement.

The round-trip movement may be any one of a front-back round-trip movement, a left-right round-trip movement, an up-down round-trip movement, or a round-trip movement in a direction forming a slant angle with respect to a horizontal plane (i.e., the user may randomly shake or swing the cell phone).

In some embodiments, if the front-back round-trip movement can trigger the first command, then, the camera may be moved in the front and back direction within the second predetermined time period a priori, to obtain a range for the acceleration of the camera in the X axis direction, a range for the acceleration in the Y axis direction, and a range for the acceleration in the Z axis direction. Such processes may be repeated multiple times. Statistics may be performed to obtain the second predetermined range, the third predetermined range, and the fourth predetermined range corresponding to the front-back round-trip movement of the camera within the second predetermined time period, which may be stored in the camera when the camera leaves the factory.

The same method may be used to obtain the second predetermined range, the third predetermined range, and the fourth predetermined range corresponding to the left-right round-trip movement, the up-down round-trip movement, or the round-trip movement in a direction forming a slant angle with respect to the horizontal plane of the camera when the camera performs these movements within the second predetermined time period.

It can be understood that, the above four different forms of round-trip movements correspond to at least four groups of acceleration ranges. Each group of acceleration ranges may include: a second predetermined range, a third predetermined range, a fourth predetermined range.

The camera may store at least one group of the at least four groups of acceleration ranges when leaving the factory.

For example, if the camera stores the second predetermined range, the third predetermined range, and the fourth predetermined range corresponding to the left-right round-trip movement of the camera within the second predetermined time period, it may indicate that the first command can be triggered when the camera performs the left-right round-trip movement. If the user desires to display the image captured by the lens 13 on the second screen 12, the user may move the camera to the left and right within the second predetermined time period, such that the camera performs the left-right round-trip movement.

As another example, if the camera stores the second predetermined range, the third predetermined range, and the fourth predetermined range corresponding to the left-right round-trip movement of the camera within the second predetermined time period, and stores the second predetermined range, the third predetermined range, the fourth predetermined range corresponding to the front-back round-trip movement within the second predetermined time period, it may indicate that the first command can be triggered when the camera performs the left-right round-trip movement or the front-back round-trip movement. If the user desires to display the image captured by the lens 13 on the second screen 12, the user may move the camera left-and-right or front-and-back within the second predetermined time period, such that the camera performs the left-right round-trip movement or the front-back round-trip movement.

In some embodiments, the second predetermined time period may be 0.5 to 2 seconds.

In some embodiments, the user may move the camera in a direction within the second predetermined time period, e.g., the user may cause the camera to move in a direction. The accelerometer inside the camera may detect, during the movement of the camera, the acceleration in the X axis direction, the acceleration in the Y axis direction, and the acceleration in the Z axis direction. After the controller inside the camera obtains, during the movement of the camera, the acceleration in the X axis direction, the acceleration in the Y axis direction, and the acceleration in the Z axis direction, if the controller determines that within the second predetermined time period the acceleration of the camera in the X axis direction is within the second predetermined range, the acceleration in the Y axis direction is within the third predetermined range, and the acceleration in the Z axis direction is within the fourth predetermined rage, the controller may trigger the first command. The second predetermined range, the third predetermined range, and the fourth predetermined range may be ranges corresponding to the moving state of the camera being moving in a first direction.

Moving in the first direction may include moving upwardly, moving downwardly, moving to the left, moving to the right, or moving obliquely.

It can be understood that, the above five different forms of moving in the first direction at least correspond to five groups of acceleration ranges. Each group of acceleration ranges may include: a second predetermined range, a third predetermined range, a fourth predetermined range. The camera may store at least one group of the at least five groups of acceleration ranges when leaving the factory.

The method for obtaining the second predetermined range, the third predetermined range, and the fourth predetermined range included in each group of acceleration ranges can refer to the method in the previous implementation method, which is not repeated.

In some embodiments, the second predetermined time period may be 0.5 to 2 seconds.

Next, after the first command is triggered, the camera may control the switch from the first screen 11 to the second screen 12 to display the image captured by the lens 13.

Because in a selfie shooting, there is a need to place the lens 13 of the camera to face oneself, the second screen 12 may face the user. After the controller controls the display of the image captured by the lens 13 on the second screen 12, the user can view the image captured by the lens 13 when the user performs the selfie shooting.

The method of the present embodiment enables the user to view the image captured by the lens when performing a selfie shooting, thereby enabling the user to capture the user desired images. User experience is enhanced.

Corresponding to the embodiments shown in FIG. 7, if the user switches from a selfie shooting to a non-selfie shooting, the screen control method may include: obtaining an acceleration of the camera in the X axis direction, an acceleration in the Y axis direction, and an acceleration in the Z axis direction; triggering the first command if, within the second predetermined time period, the acceleration of the camera in the X axis direction is within the second predetermined range, the acceleration in the Y axis direction is within the third predetermined range, and the acceleration in the Z axis direction is within the fourth predetermined range; and controlling switching from the second screen 12 to the first screen 11 to display the image captured by the lens 13. The detailed processes are not repeated.

Figure 8:
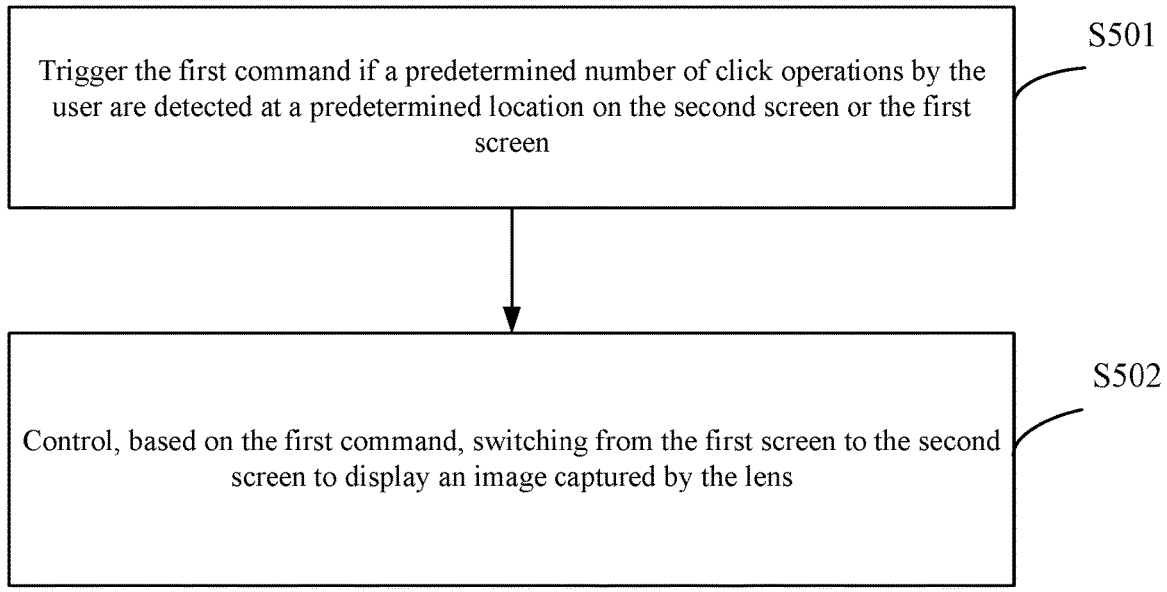
FIG. 8 is a fifth flow chart illustrating a screen control method, in accordance with an embodiment of the present disclosure.

FIG. 8 is a fifth flow chart illustrating a screen control method provided by embodiments of the present disclosure. As shown in FIG. 8, the method of the present embodiment may include:

Step S501: triggering the first command if a predetermined number of click operations by the user are detected at a predetermined location on the second screen 12 or the first screen 11;

Step S502: controlling, based on the first command, switching from the first screen 11 to the second screen 12 to display an image captured by the lens 13.

In some embodiments, the second screen 12 and/or the first screen 11 of the present embodiment are touch screens. In addition, the second screen 12 and/or the first screen 11 of the camera of the present embodiment may display a predetermined icon button.

In some embodiments, if the first screen 11 displays an image captured by the lens 13, when the user desires to perform a selfie shooting, the user may click the predetermined icon button on the second screen 12 or the first screen 11. The camera may detect a one-time click operation by the user on the predetermined icon button on the second screen 12 or the first screen 11, and may trigger the first command. In some embodiments, the predetermined location may be a location at which the predetermined icon button is located on the second screen 12 or the first screen 11.

It can be understood that, the name of the predetermined icon button may be switch screen or control screen, etc.

In some embodiments, the user may click a blank region for a predetermined number of times on the second screen 12 or the first screen 11. The camera may detect the predetermined number of click operations by the user at the blank region on the second screen 12 or the first screen 11, and may trigger the first command. The predetermined location may be the blank region of the second screen 12 or the first screen 11.

In some embodiments, the predetermined number of times may be 1 time, 2 times, or 3 times.

Next, after the first command is triggered, the camera may control switching from the first screen 11 to the second screen 12 to display the image captured by the lens 13.

Because in a selfie shooting, there is a need to place the lens 13 of the camera to face oneself, the second screen 12 may face the user. After the controller controls display of the image captured by the lens 13 on the second screen 12, the user may view the image captured by the lens 13 in the selfie shooting.

It can be understood that, if the second screen 12 and the first screen 11 are both touch screens, when switching from a non-selfie shooting scene to a selfie shooting scene, the user may place the lens 13 of the camera to face the user after the second screen 12 displays the image captured by the lens 13. Then, the user may perform the click operation on the first screen 11. When switching from the non-selfie shooting scene to the selfie shooting scene, the user may place the lens 13 of the camera to face the user first. At this moment, the second screen 12 faces the user, and the user may perform the click operation on the second screen 12.

The method of the present embodiment enables the user to view the image captured by the lens when performing the selfie shooting, thereby enabling the user to capture the user desired images. User experience is also enhanced.

Corresponding to the embodiment shown FIG. 8, when switching from a selfie shooting to a non-selfie shooting, the screen control method may include: triggering the first command when a predetermined number of click operations by the user at a predetermined location on the first screen 11 or the second screen 12 are detected; and controlling, based on the first command, switching from the second screen 12 to the first screen 11 to display an image captured by the lens 13. The detailed processes are not repeated.

Figure 9:
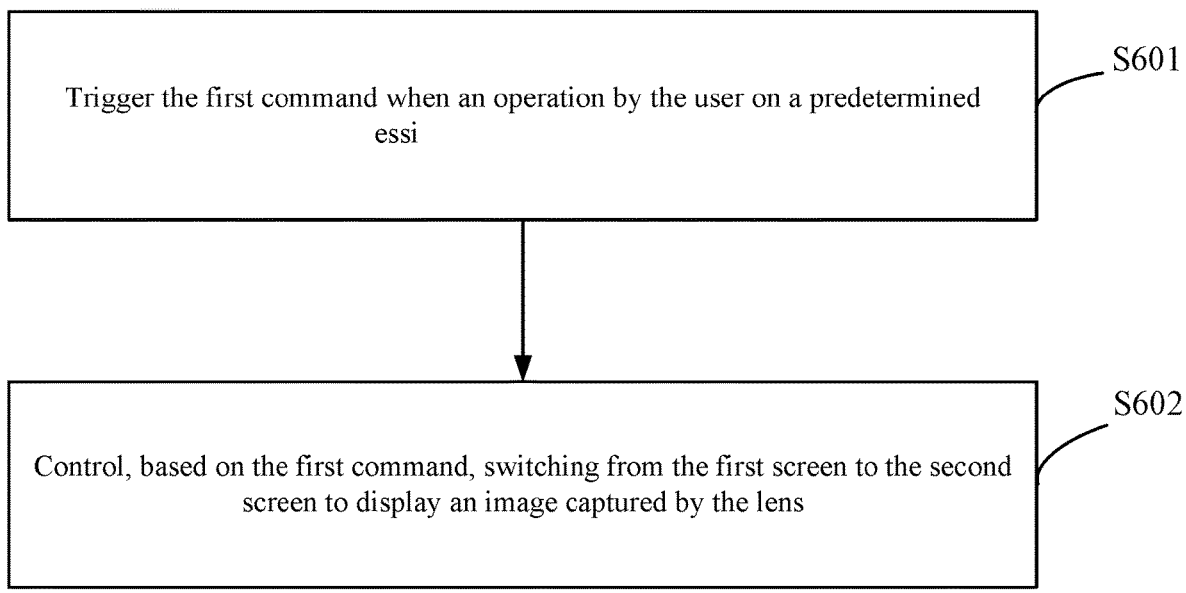
FIG. 9 is a sixth flow chart illustrating a screen control method, in accordance with an embodiment of the present disclosure.

FIG. 9 is a fifth flow chart illustrating a screen control method provided by embodiments of the present disclosure. As shown in FIG. 9, the method of the present disclosure may include:

Step S601: triggering the first command when an operation by the user on a predetermined physical pressing key of the camera is detected;

Steps S602: controlling, based on the first command, switching from the first screen 11 to the second screen 12 to display an image captured by the lens 13.

In some embodiments, the camera of the present embodiment is a camera having the predetermined physical pressing key.

In some embodiments, if the first screen 11 displays an image captured by the lens 13, when the user desires to perform a selfie shooting, the user may operate the predetermined physical pressing key. The camera may detect the operation by the user on the predetermined physical pressing key, and may trigger the first command.

In some embodiments, the predetermined physical pressing key may be a physical pressing key newly added and dedicated for switching the screen for displaying the image captured by the lens 13, such as the screen switching key 15 shown in FIG. 3. In the present embodiment, the physical pressing key is not limited to a pressable key, and can also be a slidable key.

The user operation on the predetermined physical pressing key may be the user clicking the predetermined physical pressing key (i.e., pressing and immediately releasing the predetermined physical pressing key), the user sliding the physical pressing key from a first location to a second location, or the user pressing the predetermined physical pressing key for a third predetermined time period.

In some embodiments, the third predetermined time period may be any time period between 1 second to 2 seconds.

Next, after the first command is triggered, the camera may switch from the first screen 11 to the second screen 12 to display an image captured by the lens 13.

Because in a selfie shooting, there is a need to place the lens 13 of the camera to face oneself, the second screen 12 may face the user. After the controller controls the display of the image captured by the lens 13 on the second screen 12, the user can view the image captured by the lens 13 when performing the selfie shooting.

The method of the present embodiment enables the user to view the image captured by the lens in a selfie shooting, thereby enabling the user to capture the user desired images. User experience is enhanced.

Corresponding to the embodiment shown in FIG. 9, when a selfie shooting is switched to a non-selfie shooting, the screen control method may include: triggering the first command when detecting an operation of the user on the predetermined physical pressing key of the camera; and controlling, based on the first command, switching from the second screen 12 to the first screen 11 to display an image captured by the lens 13. The detailed processes are not repeated.

Figure 10:
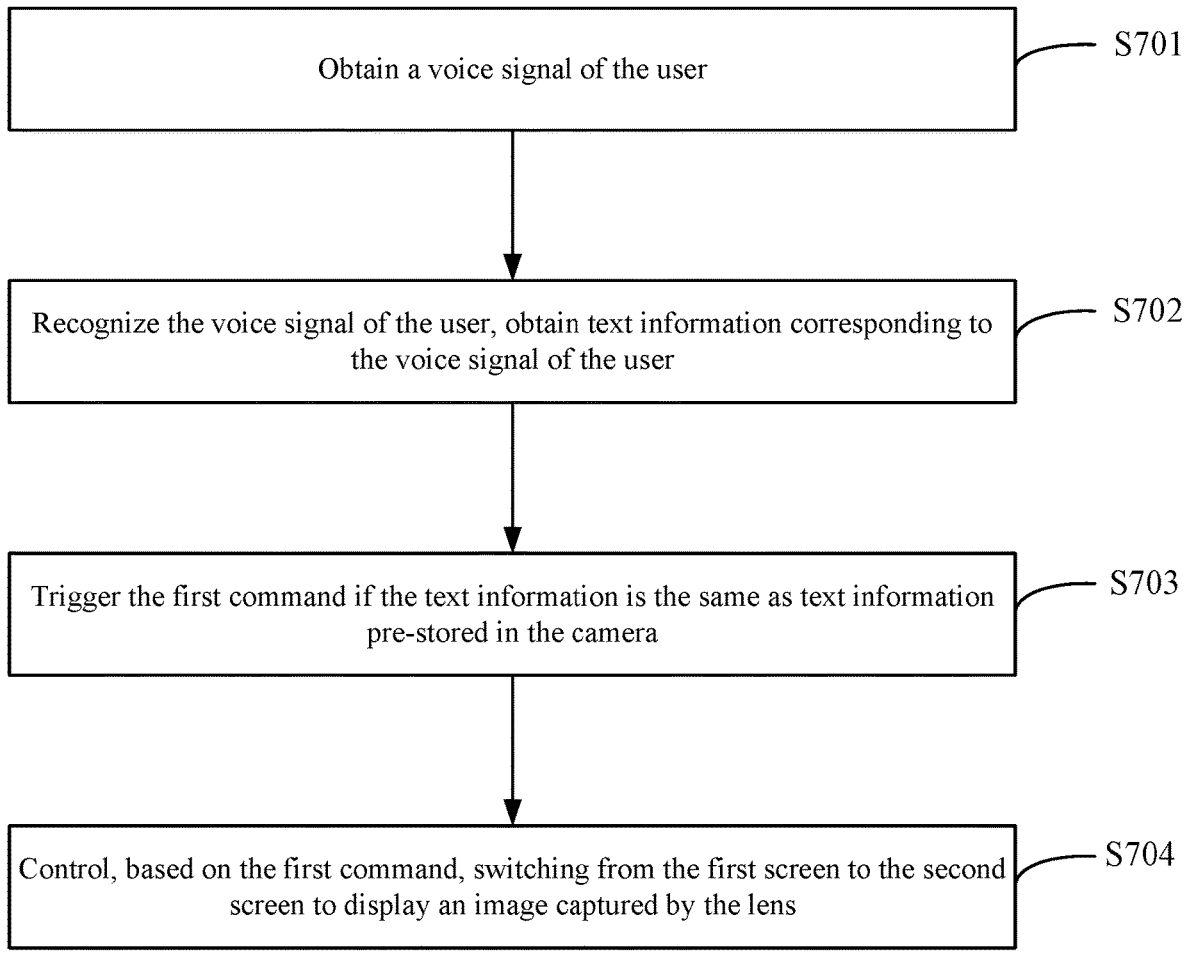
FIG. 10 is a seventh flow chart illustrating a screen control method, in accordance with an embodiment of the present disclosure.

FIG. 10 is a sixth flow chart illustrating a screen control method provided by embodiments of the present disclosure. As shown in FIG. 10, the method of the present embodiment may include:

Step S701: obtaining a voice signal of the user;

Step S702: recognizing the voice signal of the user, and obtaining text information corresponding to the voice signal of the user.

Step S703: triggering the first command if the text information is the same as text information pre-stored in the camera.

Step S704: controlling, based on the first command, switching from the first screen 11 to the second screen 12 to display an image captured by the lens 13.

In some embodiments, the camera of the present embodiment is a camera having a voice receiver and a voice recognition function. The voice receiver of the present embodiment may be a microphone.

In some embodiments, if the first screen 11 displays an image captured by the lens 13, when the user desires to perform a selfie shooting, the user may utter a predetermined word or sentence. The voice receiver of the camera may receive the voice signal corresponding to the predetermined word or sentence. The controller of the camera may obtain the voice signal, recognize the voice signal, and obtain text information corresponding to the voice signal. The controller may determine whether the text information corresponding to the voice signal is the same as the text information pre-stored in the camera. If they are the same, the controller may trigger the first command.

The predetermined word may be "switch" or "screen." The predetermined sentence may be "display images at the front screen."

In some embodiments, if the predetermined word is switch, then the text information pre-stored in the camera may be "switch".

Next, after the first command is triggered, the camera may control switching from the first screen 11 to the second screen 12 to display an image captured by the lens 13.

Because in the selfie shooting, there is a need to place the lens 13 to face oneself, the second screen 12 may face the user. After the controller controls display of the image captured by the lens 13 on the second screen 12, the user can view the image captured by the lens 13 in the selfie shooting.

The method of the present embodiment enables the user to view the image captured by the lens in the selfie shooting, thereby enabling the user to capture the user desired images. User experience is enhanced.

Corresponding to the embodiment shown in FIG. 10, when the user switches from a selfie shooting to a non-selfie shooting, the screen control method may include: obtaining a voice signal of the user; recognizing the voice signal of the user, and obtaining text information corresponding to the voice signal of the user; if the text information is the same as the text information pre-stored in the camera, triggering the first command; and controlling, based on the first command, switching from the second screen 12 to the first screen 11 to display an image captured by the lens 13. The detailed processes are not repeated.

Figure 11:
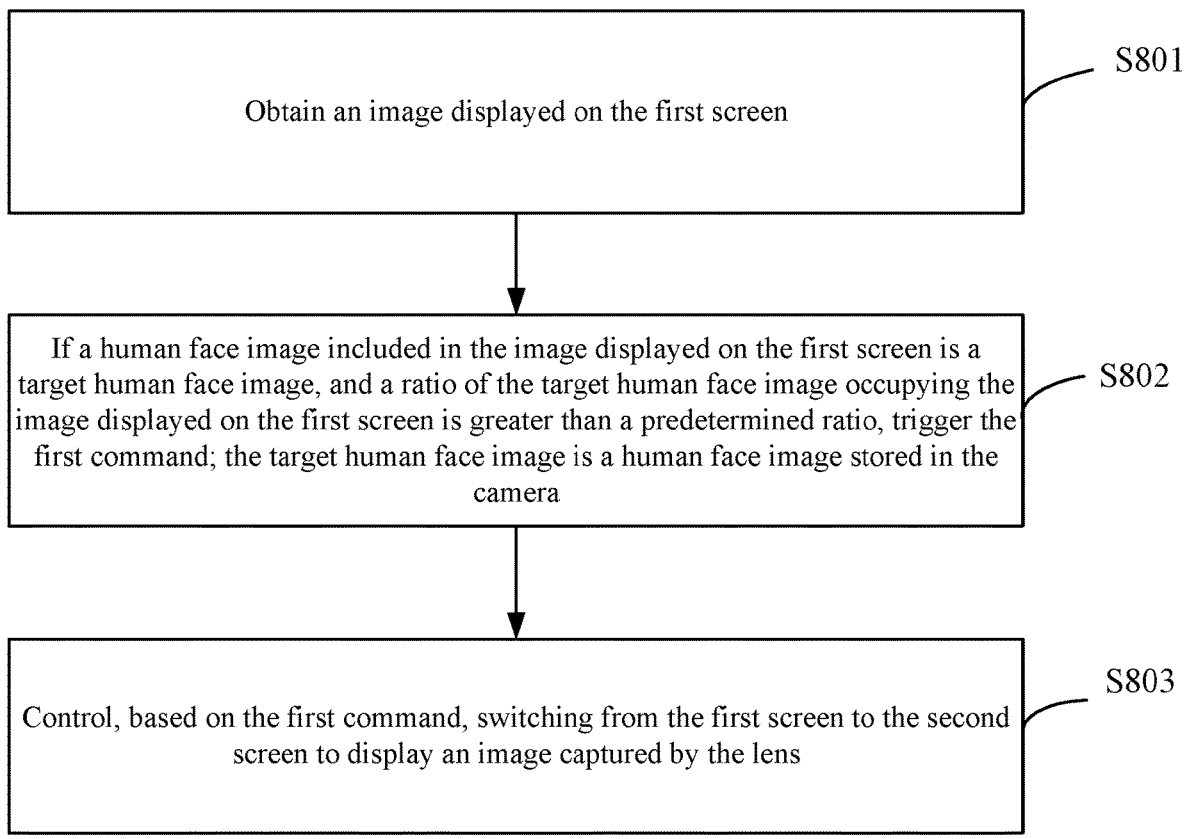
FIG. 11 is an eighth flow chart illustrating a screen control method, in accordance with an embodiment of the present disclosure.

FIG. 11 is a seventh flow chart illustrating a screen control method provided by embodiments of the present disclosure. As shown in FIG. 11, the method of the present embodiment may include:

Step S801: obtaining an image displayed on the first screen 11;

Step S802: if a human face image included in the image displayed on the first screen 11 is a target human face image, and a ratio of the target human face image occupying the image displayed on the first screen 11 is greater than a predetermined ratio, triggering the first command; the target human face image is a human face image stored in the camera;

Step S803: controlling, based on the first command, switching from the first screen 11 to the second screen 12 to display an image captured by the lens 13.

In some embodiments, the camera of the present embodiment may include an image acquisition device communicatively connected with the controller.

In some embodiments, if the first screen 11 displays an image captured by the lens 13, when the user desires to perform a selfie shooting, the user may place his or her face as close to the lens 13 as possible. The image acquisition device may acquire the entire image displayed on the first screen 11. The controller of the camera may obtain the acquired entire image displayed on the first screen 11, and detect whether a human face image of the entire image is a target human face image. If the human face image of the entire image is the target human face image, then the controller may determine whether a ratio of the target human face image occupying the entire image is greater than a predetermined ratio. If the ratio is greater than the predetermined ratio, then the controller may trigger the first command.

In some embodiments, the target human face image may be a human face image stored in the camera.

In some embodiments, the predetermined ratio may be any ratio between 90%~100%;

In some embodiments, the predetermined ratio may be any ratio between 95%~100%;

In some embodiments, the predetermined ratio may be stored in the camera.

Next, after the first command is triggered, the camera may control switching from the first screen 11 to the second screen 12 to display an image captured by the lens 13.

Because in a selfie shooting, there is a need to place the lens 13 to face oneself, the second screen 12 may face the user. After the controller controls the display of the image captured by the lens 13 on the second screen 12, the user can view the image captured by the lens 13 in the selfie shooting.

The method of the present embodiment enables the user to view the image captured by the lens in the selfie shooting, thereby enabling the user to capture the user desired images. User experience is enhanced.

Corresponding to the embodiment shown in FIG. 11, when the user switches from the selfie shooting to the non-selfie shooting, the screen control method may include: obtaining an image displayed on the second screen 12; if a human face image included in the image displayed on the second screen 12 is a target human face image, and a ratio of the target human face image occupying the image displayed on the second screen 12 is greater than a predetermined ratio, triggering the first command; the target human face image is a human face image stored in the camera; and controlling, based on the first command, switching from the second screen 12 to the first screen 11 to display an image captured by the lens 13. The detailed processes are not repeated.

Figure 12:
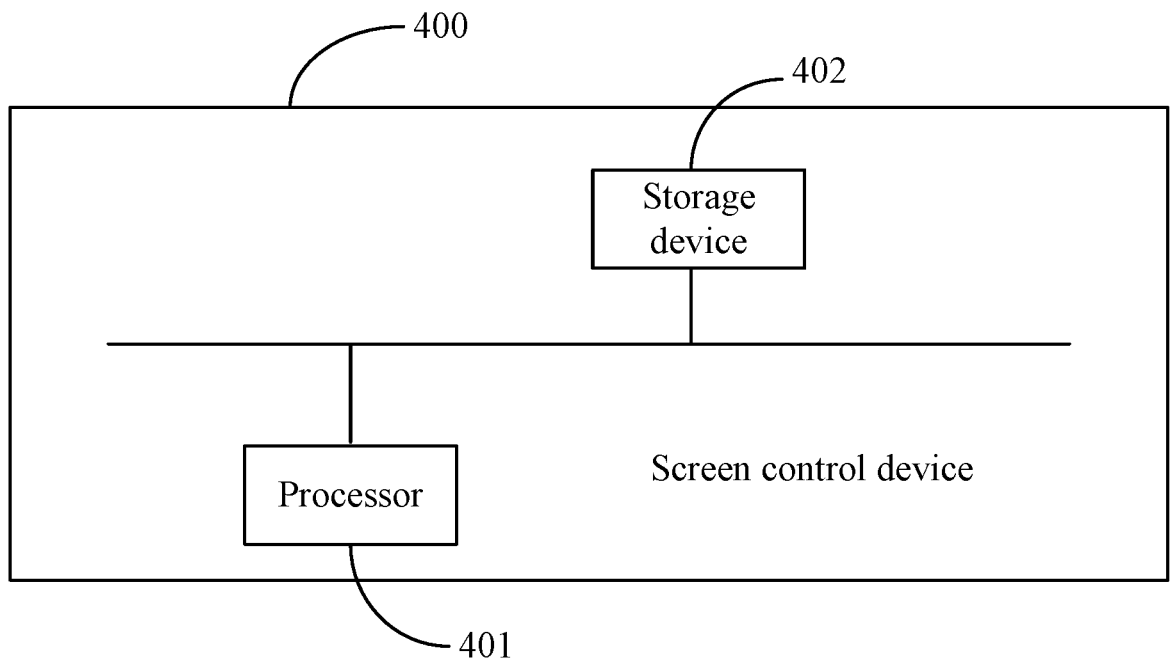
FIG. 12 is a first schematic diagram of a structure of a screen control device, in accordance with an embodiment of the present disclosure.

FIG. 12 is a first schematic illustration of a structure of a screen control device provided by embodiments of the present disclosure. As shown in FIG. 12, a screen control device 400 of the present disclosure may include: a storage device 41 and a processor 42, the storage device 41 being coupled with the processor 42.

The storage device 41 may be configured to store program instructions.

The processor 42 may be configured to retrieve the program instructions from the storage device 41 to execute the solutions of the above various embodiments.

The screen control device of the present embodiment may be configured to execute the technical solutions of the above various embodiments of the method. The realization principles and technical effects are similar, which are not repeated.

In some embodiments, the controller in the following various embodiments may be at least a part of the processor 41.

Figure 13:
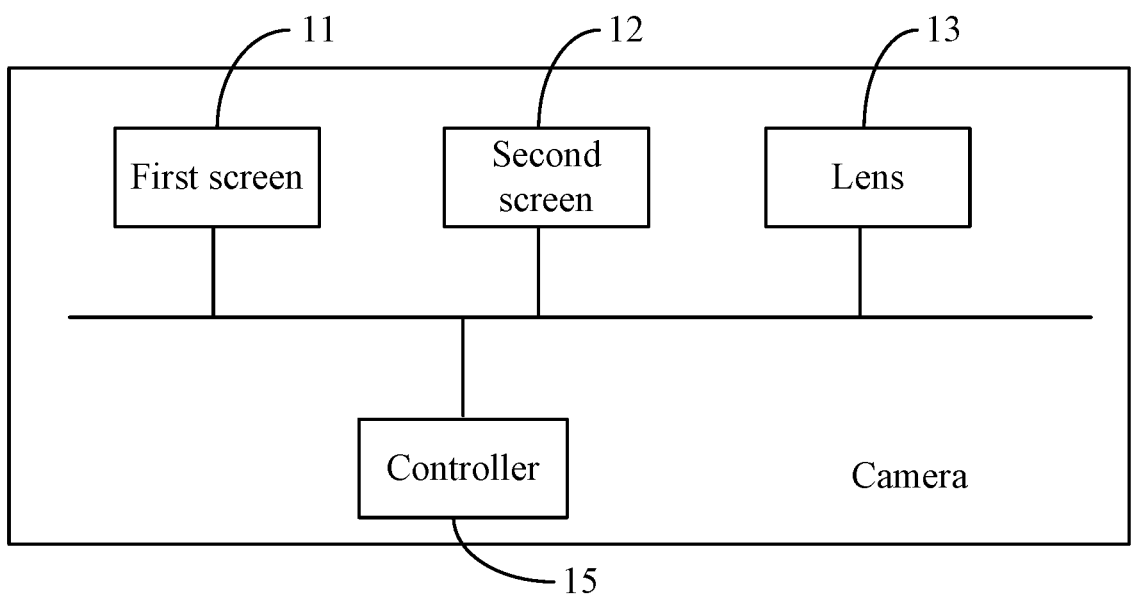
FIG. 13 is a second schematic diagram of a structure of the screen control device, in accordance with an embodiment of the present disclosure.

FIG. 13 is a second schematic illustration of a structure of a screen control device provided by the embodiments of the present disclosure. As shown in FIG. 13, the screen control device of the present embodiment may include a machine body, a first screen, a second screen, and a lens disposed on the machine body, and a controller disposed inside the machine body. The first screen and the second screen may be disposed facing against one another. The lens may be disposed at the second screen side. The controller may be communicatively connected with the first screen, the second screen, and the lens. The first screen may be a screen that displays an image captured by the lens after the screen control device starts up.

The controller 51 may be configured to obtain a first command. The first command may be configured to instruct to display the image captured by the lens on the second screen.

The controller 51 may be configured to control the display of the image captured by the lens on the second screen based on the first command.

The screen control device of the present embodiment may be configured to execute the technical solutions of the above various embodiments of the method. The realization principles and the technical effects are similar, which are not repeated.

In some embodiments, the controller may be configured to:

switch display of an image captured by the lens from the first screen the second screen based on the first command.

In some embodiments, the controller may be configured to: control the first screen to be in a screen blackout state.

In some embodiments, the controller may be configured to obtain a touch path of the user on the second screen or the first screen. If the touch path is the same as a predetermined path stored in the camera, the controller may trigger the first command.

In some embodiments, the controller may be configured to trigger the first command if a predetermined number of click operations by the user is detected at a predetermined location on the second screen or the first screen.

In some embodiments, the predetermined location may be a location of a predetermined icon button on the second screen or the first screen; or the predetermined location may be a blank region on the second screen or the first screen.

In some embodiments, the predetermined number may be 1 time, 2 times, or 3 times.

The screen control device of the present embodiment may be configured to execute the technical solutions of the above various embodiments of the method. The principles and technical effects are similar, which are not repeated.

Figure 14:
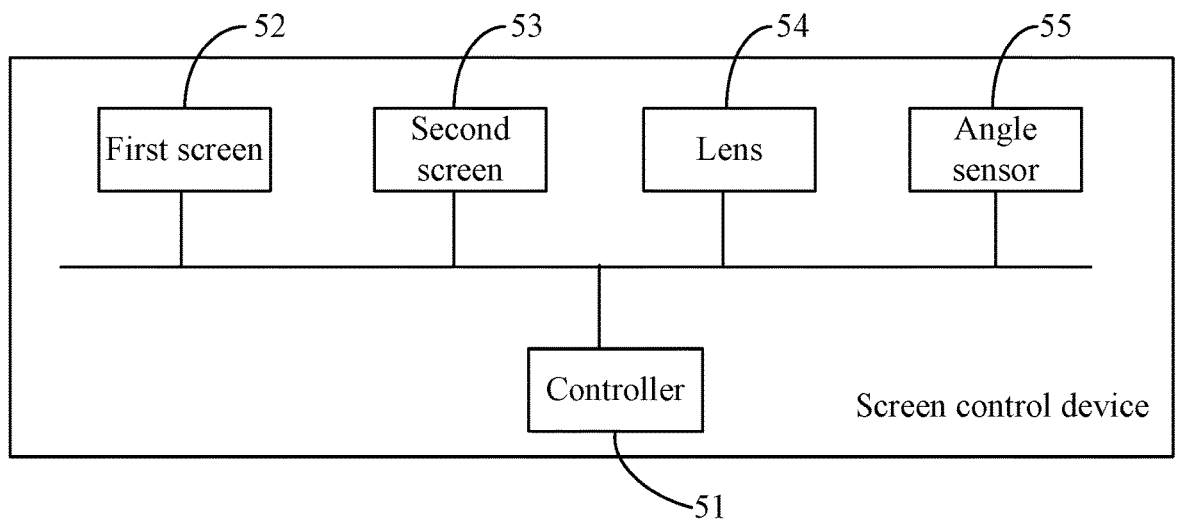
FIG. 14 is a third schematic diagram of a structure of the screen control device, in accordance with an embodiment of the present disclosure.

FIG. 14 is a third schematic illustration of a structure of the screen control device provided by embodiments of the present disclosure. As shown in FIG. 14, the screen control device of the present embodiment may also include, on the basis of the screen control device shown in FIG. 13: an angle sensor 55 communicatively connected with the controller 51.

The angle sensor 55 may be configured to detect a rotation angle or a rotation angular velocity of the camera.

The controller 51 may be configured to: obtain a rotation angle of the camera based on the rotation angle or rotation angular velocity detected by the angle sensor. If the rotation angle of the camera within a first predetermined time period is within a first predetermined range, the controller 51 may trigger the first command. In some embodiments, the first predetermined time period may be any time period between 0.2 to 2 seconds.

In some embodiments, the first predetermined time period may be any time period between 0.5 to 1 seconds.

In some embodiments, the first predetermined range may be 160° to 200°, or −200° to −160°.

In some embodiments, the first predetermined range may be 170° to 180°, or −190° to −170°.

The screen control device of the present embodiment may be configured to execute the technical solutions of the above various embodiments of the method. The principles and technical effects are similar, which are not repeated.

Figure 15:
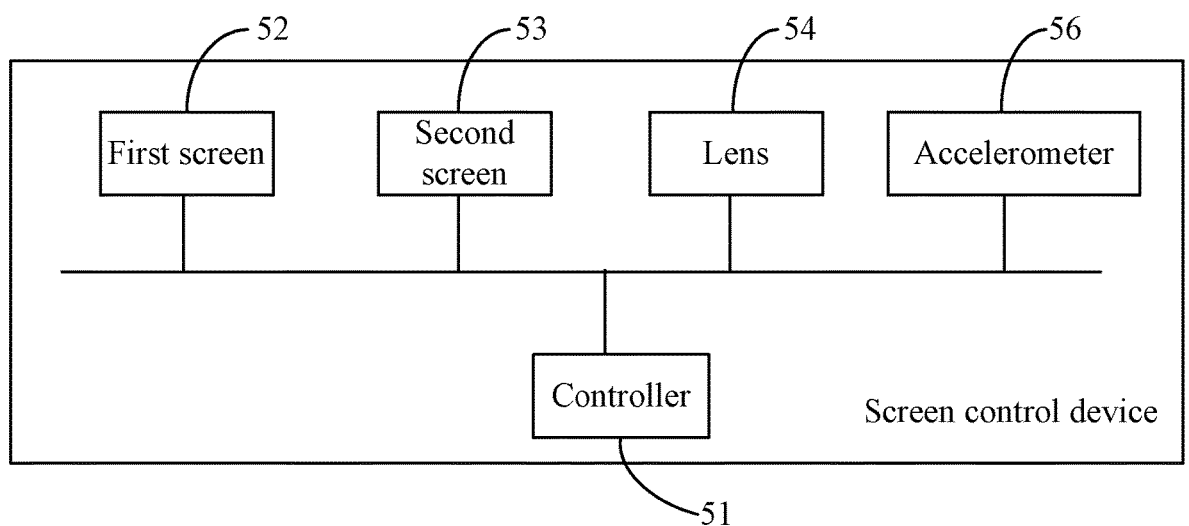
FIG. 15 is a fourth schematic diagram of a structure of the screen control device, in accordance with an embodiment of the present disclosure.

FIG. 15 is a fourth schematic illustration of a screen control device provided by the embodiments of the present disclosure. As shown in FIG. 15, the screen control device of the present embodiment may also include, on the basis of the screen control device shown in FIG. 13: an accelerometer 56 communicatively connected with the controller 51.

The accelerometer 56 may be configured to detect an acceleration of the camera in the X axis direction, an acceleration in the Y axis direction, and an acceleration in the Z axis direction.

The controller 51 may be configured to:

obtain the acceleration of the camera in the X axis direction, the acceleration in the Y axis direction, and the acceleration in the Z axis direction as detected by the accelerometer; and trigger the first command if, within the second predetermined time period, the acceleration of the camera in the X axis direction is within the second predetermined range, the acceleration in the Y axis direction is within the third predetermined range, and the acceleration in the Z axis direction is within the fourth predetermined range.

In some embodiments, the second predetermined time period may be any time period between 0.5 seconds to 2 seconds.

In some embodiments, all of the second predetermined range, the third predetermined range, and the fourth predetermined range may be ranges corresponding to the moving state of the camera being a round-trip movement.

In some embodiments, all of the second predetermined range, the third predetermined range, and the fourth predetermined range may be ranges corresponding to the moving state of the camera being moving in a first direction.

The screen control device of the present embodiment may be configured to execute the technical solutions of the above various embodiments of the method. The principles and technical effects are similar, which are not repeated.

Figure 16:
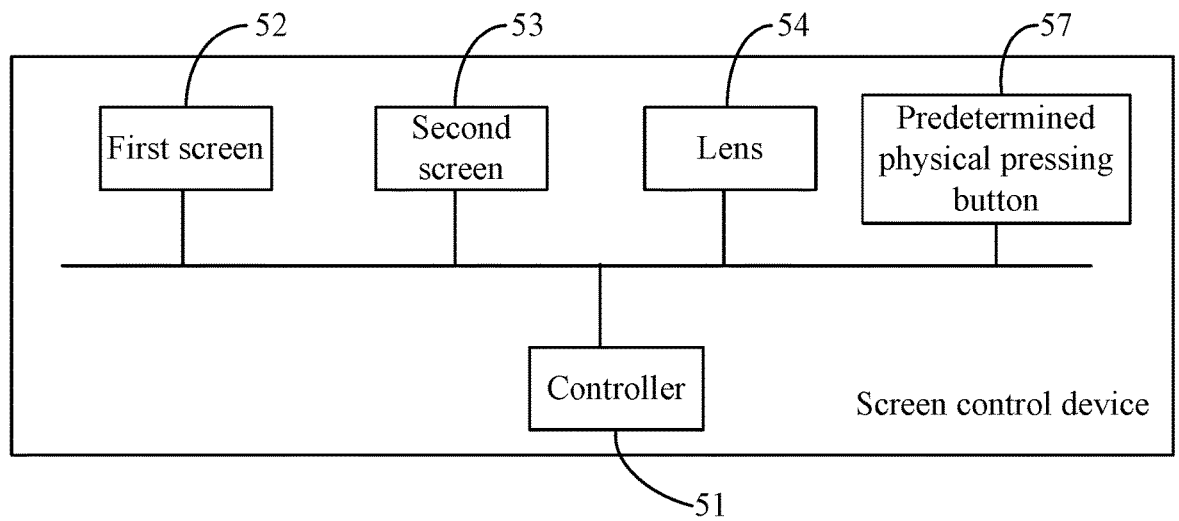
FIG. 16 is a fifth schematic diagram of a structure of the screen control device, in accordance with an embodiment of the present disclosure.

FIG. 16 is a fifth schematic illustration of a screen control device provided by embodiments of the present disclosure. As shown in FIG. 16, the screen control device of the present disclosure may also include, on the basis of the screen control device shown in FIG. 13: a predetermined physical pressing key 57 communicatively connected with the controller 51.

The controller 51 may be configured to trigger the first command if an operation on the predetermined physical pressing key by the user is detected.

The operation by the user on the predetermined physical pressing key of the camera may include any of the following items:

the user clicking the predetermined physical pressing key;

the user sliding the predetermined physical pressing key from a first location to a second location; or the user pressing the predetermined physical pressing key for a third predetermined time period.

In some embodiments, the third predetermined time period may be any time period between 1 second to 2 seconds.

The screen control device of the present embodiment may be configured to execute the technical solutions of the above various embodiments of the method. The principles and technical effects are similar, which are not repeated.

Figure 17:
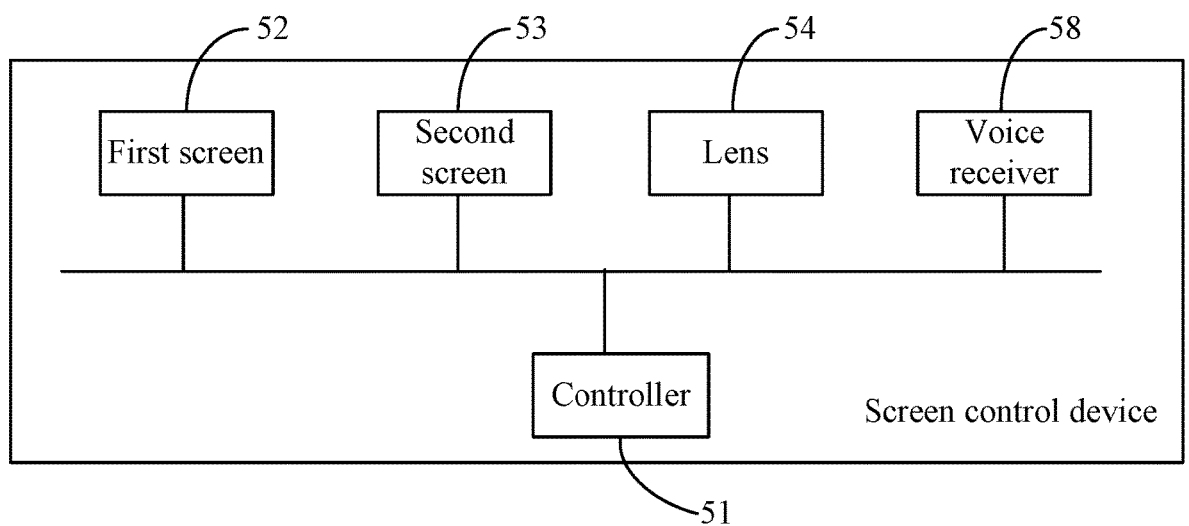
FIG. 17 is a sixth schematic diagram of a structure of the screen control device, in accordance with an embodiment of the present disclosure.

FIG. 17 is a sixth schematic illustration of a screen control device provided by embodiments of the present disclosure. As shown in FIG. 17, the screen control device of the present embodiment may also include, on the basis of the screen control device shown in FIG. 13: a voice receiver 58 communicatively connected with the controller 51.

The voice receiver 58 may be configured to receive a voice signal of the user.

The controller 51 may be configured to:

obtain the voice signal of the user from the voice receiver;

recognize the voice signal, obtain text information corresponding to the voice signal; and trigger the first command if the text information is the same as text information stored in the camera.

The screen control device of the present embodiment may be configured to execute the technical solutions of the above various embodiments of the method. The principles and technical effects are similar, which are not repeated.

Figure 18:
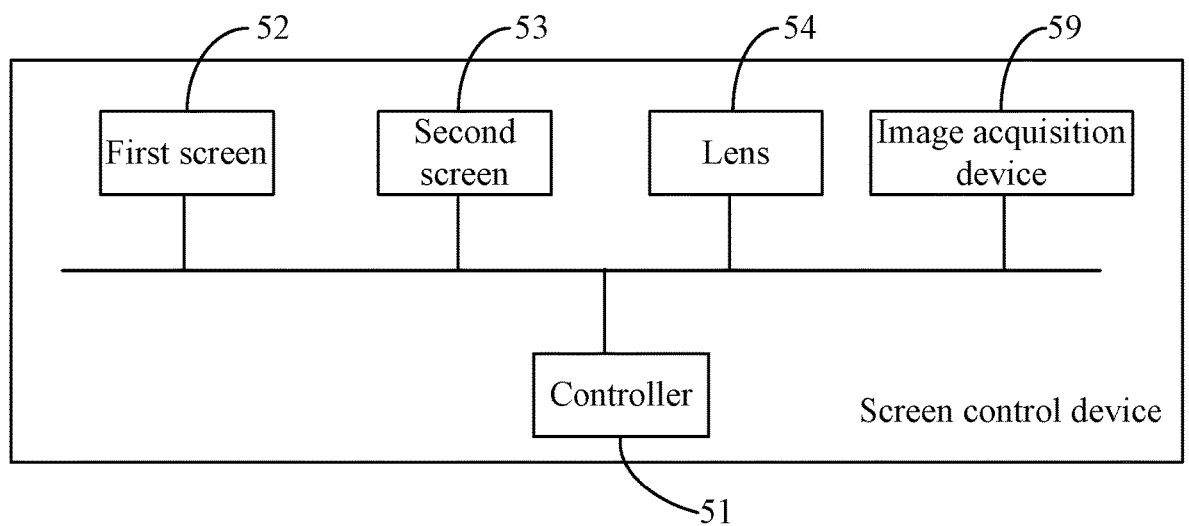
FIG. 18 is a seventh schematic diagram of a structure of the screen control device, in accordance with an embodiment of the present disclosure.

FIG. 18 is a seventh schematic illustration of a screen control device provided by embodiments of the present disclosure. As shown in FIG. 18, the screen control device may also include, on the basis of the screen control device shown in FIG. 13: an image acquisition device 59 communicatively connected with the controller 51.

The image acquisition device 59 may be configured to acquire the image displayed on the first screen.

The controller 51 may be configured to obtain the image, and if a human face image included in the image is a target human face image, and a ratio of the target human face image occupying the image is greater than a predetermined ratio, trigger the first command. The target human face image may be a human face image stored in the screen control device.

In some embodiments, the predetermined ratio may be any ratio between 90% 100%.

The screen control device of the present embodiment may be configured to execute the technical solutions of the above various embodiments of the method. The principles and technical effects are similar, which are not repeated.

A person having ordinary skills in the art can appreciate: all or some of the steps realizing the various embodiments of the method may be accomplished through hardware relevant to program instructions. The program may be stored in a computer-readable storage medium. When executed, the program executes the steps of the above various embodiments of the method; the storage medium includes various media that can store program codes: ROM, RAM, magnetic disks or optical disks, etc.

Finally, it should be noted: the above various embodiments are only for explaining the technical solutions of the present disclosure, and are not for limiting the present disclosure. Although the present disclosure has been described in detail with reference to the above various embodiments, a person having ordinary skills in the art can appreciate: the technical solutions described in the various embodiments can be modified, or part or all of the technical features included therein can be equivalently substituted. Such modification or substitution does not make the spirit of the corresponding technical solutions fall out of the scope of the technical solutions of the various embodiments of the present disclosure.

What is claimed is:

1. A screen control method implemented in a terminal device having a first screen, a second screen, and a lens, the first screen and the second screen being disposed facing against one another, the method comprising:

obtaining a command configured to instruct to display an image captured by the lens on the second screen when the image is displayed on the first screen;

switching the image captured by the lens and displayed on the first screen to be displayed on the second screen based on the command; and controlling the first screen to be in a screen blackout state.

2. The screen control method according to claim 1, wherein obtaining the command comprises:

obtaining a touch path of a user on the second screen or the first screen; and triggering the command if the touch path is the same as a predetermined path stored in the terminal device.

3. The screen control method according to claim 1, wherein obtaining the command comprises:

obtaining a rotation angle of the terminal device; and triggering the command if the rotation angle of the terminal device obtained within a first predetermined time period is within a first predetermined range.

4. The screen control method according to claim 3, wherein obtaining the rotation angle of the terminal device comprises:

obtaining the rotation angle of the terminal device detected through an angle sensor of the terminal device.

5. The screen control method according to claim 3, wherein the first predetermined time period is between 0.2 to 2 seconds.

6. The screen control method according to claim 5, wherein the first predetermined time period is between 0.5 to 1 seconds.

7. The screen control method according to claim 3, wherein the first predetermined range is 160° to 200°, or −200° to −160°.

8. The screen control method according to claim 7, wherein the first predetermined range is 170° to 180°, or −190° to −170°.

9. The screen control method according to claim 1, wherein obtaining the command comprises:

obtaining an acceleration in an X axis direction, an acceleration in a Y axis direction, and an acceleration in a Z axis direction of the terminal device; and triggering the command if, within a second predetermined time period, the acceleration of the terminal device in the X axis direction is within a second predetermined range, the acceleration in the Y axis direction is within a third predetermined range, and the acceleration in the Z axis direction is within a fourth predetermined range.

10. The screen control method according to claim 9, wherein the second predetermined time period is between 0.5 to 2 seconds.

11. The screen control method according to claim 9, wherein the second predetermined range, the third predetermined range, and the fourth predetermined range are ranges corresponding to a moving state of the terminal device being in a round-trip movement.

12. The screen control method according to claim 9, wherein the second predetermined range, the third predetermined range, and the fourth predetermined range are ranges corresponding to a moving state of the terminal device being moving in a first direction.

13. The screen control method according to claim 1, wherein obtaining the command comprises:

triggering the command if a predetermined number of click operations by the user are detected at a predetermined location on the second screen or the first screen.

14. The screen control method according to claim 13, wherein the predetermined location is a location at which a predetermined icon button is located on the second screen or the first screen; or the predetermined location is a blank region on the second screen or the first screen.

15. The screen control method according to claim 1, wherein obtaining the command comprises:

triggering the command if an operation of a predetermined physical pressing key of the terminal device by a user is detected.

16. The screen control method according to claim 15, wherein the operation of the predetermined physical pressing key by the user comprises at least one of the following:

the user clicking the predetermined physical pressing key;

the user sliding the predetermined physical pressing key from a first location to a second location; or the user pressing the predetermined physical pressing key for a third predetermined time period.

17. The screen control method according to claim 1, wherein obtaining the command comprises:

obtaining a voice signal of a user;

recognizing the voice signal, and obtaining text information corresponding to the voice signal; and triggering a command if the text information is the same as text information pre-stored in the terminal device.

18. The screen control method according to claim 1, wherein obtaining the command comprises:

obtaining an image displayed on the first screen; and triggering the command if a human face image included in the image is a target human face image, and a ratio of the target human face image occupying the image is greater than a predetermined ratio, wherein the target human face image is a human face image stored in the terminal device.

* * * * *